United States Patent
Zhao et al.

(10) Patent No.: US 9,859,825 B2
(45) Date of Patent: Jan. 2, 2018

(54) CENTRALIZED MOTOR CONTROLLER

(71) Applicant: ZHONGSHAN BROAD-OCEAN MOTOR CO., LTD., Zhongshan (CN)

(72) Inventors: Yong Zhao, Zhongshan (CN); Ge Hu, Zhongshan (CN); Yiqiao Zhou, Zhongshan (CN); Chuping Lu, Zhongshan (CN)

(73) Assignee: ZHONGSHAN BROAD-OCEAN MOTOR CO., LTD., Zhongshan (CN)

( * ) Notice: Subject to any disclaimer, the term of this patent is extended or adjusted under 35 U.S.C. 154(b) by 11 days.

(21) Appl. No.: 14/334,620

(22) Filed: Jul. 17, 2014

(65) Prior Publication Data

US 2014/0320052 A1    Oct. 30, 2014

Related U.S. Application Data

(63) Continuation-in-part of application No. PCT/CN2013/073229, filed on Mar. 26, 2013, and a
(Continued)

(30) Foreign Application Priority Data

Jul. 28, 2012  (CN) .......................... 2012 1 0265261
Jul. 28, 2012  (CN) .......................... 2012 1 0265902

(51) Int. Cl.
*H02K 29/06*    (2006.01)
*H02P 6/18*    (2016.01)
(Continued)

(52) U.S. Cl.
CPC ............ *H02P 6/18* (2013.01); *F24F 11/0076* (2013.01); *H02P 5/74* (2013.01); *H02P 27/06* (2013.01); *H02P 31/00* (2013.01); *H02P 2207/05* (2013.01)

(58) Field of Classification Search
CPC .. H02P 6/08; H02P 31/00; H02P 25/16; F24F 11/0076

See application file for complete search history.

(56) References Cited

U.S. PATENT DOCUMENTS

2004/0012365 A1*  1/2004  Jackson .................... F15B 9/12
                                                      318/645
2006/0214613 A1*  9/2006  Murakami ............ H02P 25/105
                                                      318/376

(Continued)

*Primary Examiner* — Shawki S Ismail
*Assistant Examiner* — Zoheb Imtiaz
(74) *Attorney, Agent, or Firm* — Matthias Scholl, PC; Matthias Scholl

(57) ABSTRACT

A centralized motor controller for receiving commands from an application system controller and for controlling operation of a plurality of independent motors. The centralized motor controller includes: a power supply; a microprocessor; and an interface circuit for motor control including at least two inverter units and two rotor position detection units. The power supply supplies power for each circuit part. The motors are controlled by the microprocessor via the interface circuit for motor control. The number of the motors is equal to or more than three, in which, at least two of the motors are permanent magnet synchronous motors in the absence of a motor controller. The permanent magnet synchronous motors are driven by the microprocessor via the inverter units, respectively. Rotor position data of the permanent magnet synchronous motors are transmitted to the microprocessor via the rotor position detection units, respectively.

13 Claims, 18 Drawing Sheets

Related U.S. Application Data continuation-in-part of application No. PCT/CN2013/073219, filed on Mar. 26, 2013.

(51) Int. Cl.
*H02P 27/06* (2006.01)
*H02P 5/74* (2006.01)
*F24F 11/00* (2006.01)
*H02P 31/00* (2006.01)

(56) References Cited

U.S. PATENT DOCUMENTS

| | | | | |
|---|---|---|---|---|
| 2009/0134826 A1* | 5/2009 | Hamasaki | ........... | H02P 6/14 318/400.32 |
| 2009/0201650 A1* | 8/2009 | Hauser | ........... | A01D 34/78 361/736 |
| 2009/0246631 A1* | 10/2009 | Hojo | ........... | H01M 4/134 429/213 |
| 2010/0277826 A1* | 11/2010 | Sheffield | ........... | G11B 21/12 360/75 |
| 2011/0024211 A1* | 2/2011 | Kikuchi | ........... | B60K 6/445 180/65.25 |
| 2011/0047102 A1* | 2/2011 | Grider | ........... | B60L 8/003 705/412 |
| 2011/0191502 A1* | 8/2011 | Zhao | ........... | G06F 13/00 710/10 |
| 2012/0256566 A1* | 10/2012 | Chaffee | ........... | G05B 19/056 318/34 |
| 2015/0303859 A1* | 10/2015 | Yamada | ........... | H02P 5/74 318/51 |

* cited by examiner

CENTRALIZED MOTOR CONTROLLER

CROSS-REFERENCE TO RELATED APPLICATIONS

This application is a continuation-in-part of International Patent Application No. PCT/CN2013/073229 with an international filing date of Mar. 26, 2013, designating the United States, now pending, and further claims priority benefits to Chinese Patent Application No. 201210265261.7 filed Jul. 28, 2012, and is also a continuation-in-part of International Patent Application No. PCT/CN2013/073219 with an international filing date of Mar. 26, 2013, designating the United States, now pending, and further claims priority benefits to Chinese Patent Application No. 201210265902.9 filed Jul. 28, 2012. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

Field of the Invention

The invention relates to a centralized motor controller.

Description of the Related Art

A conventional central air conditioning system, ventilation system, and washing machine system generally employ a plurality of motors, among which, at least two of the motors are permanent synchronous motors. The structure block diagram of a typical central air conditioning system HVAC is shown in FIG. 1, each motor controller includes: a power supply, a microprocessor, an inverter unit, and a rotor position detection unit. Thus, the circuits of the control part are overlapped; the structure is complicate; and the hardware and software resource cannot be fully utilized, thereby resulting in large increase of production costs and waste of resources. As the layout space of the motor controller is limited, the heat dissipation has been a tough issue.

Furthermore, different controllers for different application systems control different number of motors, and the configuration of the permanent magnet synchronous motor in the absence of a motor controller is also different from that of the AC motor. Therefore, it is desired to develop a centralized motor controller that is applicable to motors of different types.

SUMMARY OF THE INVENTION

In view of the above-described problems, it is one objective of the invention to provide a first centralized motor controller that is applicable to at least two permanent magnet synchronous motors in the absence of a motor controller. Inverter units and rotor position detection units of the permanent magnet synchronous motors are integrated on the centralized motor controller. The permanent magnet synchronous motors are controlled by the microprocessor of the centralized motor controller via the inverter units and the rotor position detection units. Thus, overlapped circuit configurations are deleted, the circuit structure is simplified, the production cost is largely decreased, and the resource waste is decreased.

It is another objective of the invention to provide a second centralized motor controller that is capable of flexibly fitting with motors of different types. At least two permanent magnet synchronous motors are provided. A mother circuit board and a plurality of daughter circuit boards are connected via connectors. A power supply of the mother circuit supplies power to each daughter circuit board. The circuit structure is simplified, overlapped circuit configurations are deleted, the production cost is largely decreased, and the resource waste is decreased.

To achieve the above objective, in accordance with one embodiment of the invention, there is provided a first centralized motor controller comprising: a power supply; a microprocessor; and an interface circuit for motor control, the interface circuit for motor control comprising at least two inverter units and two rotor position detection units. The centralized motor controller is connected to an application system controller for receiving commands therefrom and controlling operation of a plurality of independent motors. The power supply supplies power for each circuit part. The motors are controlled by the microprocessor via the interface circuit for motor control. A number of the motors is equal to or more than three, in which, at least two of the motors are permanent magnet synchronous motors in the absence of a motor controller. The permanent magnet synchronous motors are driven by the microprocessor via the inverter units, respectively. Rotor position data of the permanent magnet synchronous motors are transmitted to the microprocessor via the rotor position detection units, respectively.

In a class of this embodiment, the motors comprise an AC motor; the interface circuit for motor control comprises a relay and a drive circuit thereof; and the AC motor is controlled by the microprocessor via the relay and the drive circuit thereof.

In a class of this embodiment, the motors are all permanent magnet synchronous motors in the absence of motor controllers. The interface circuit for motor control comprises a plurality of inverter units and a plurality of rotor position detection units. One motor is connected to the microprocessor via one inverter unit and one rotor position detection unit.

In a class of this embodiment, the rotor position detection unit is a phase current detection unit; and the rotor position data are calculated by real time phase current.

In a class of this embodiment, the microprocessor is provided with an internal or external memory for storing operating parameters and operating models of the motors.

In a class of this embodiment, the application system controller is an air conditioning system controller, an HVAC system controller, a pump system controller, a washing machine controller, or an automotive controller. The microprocessor is connected to the application system controller via a user interface.

In a class of this embodiment, the power supply, the microprocessor, the user interface, and the memory are integrated on a main circuit board. One inverter and one rotor position detection unit are integrated on one daughter circuit board. The main circuit board and the daughter circuit boards are connected via connector ports and connectors.

In accordance with another embodiment of the invention, there is provided a second centralized motor controller comprising: a mother circuit board, the mother circuit board comprises a power supply and a first microprocessor; and a plurality of daughter circuit boards, each daughter circuit board comprising a second microprocessor, an inverter unit, and a rotor position detection unit. The centralized motor controller is connected to an application system controller for receiving commands therefrom and controlling operation of a plurality of independent motors. The power supply supplies power to each circuit part and each daughter circuit board. The first microprocessor receives commands from the application system controller. A number of the motors is equal to or more than three, in which, at least two of the motors are permanent magnet synchronous motors in the absence of a motor controller. At least two daughter circuit boards are provided. Each daughter circuit board is connected to one permanent magnet synchronous motor. The permanent magnet synchronous motors are driven by the second microprocessors via the inverter circuits, respectively. Rotor position data of the permanent magnet synchronous motors are transmitted to the second microprocessors via the rotor position detection units, respectively. The mother circuit board and the daughter circuit boards form electric connection via connectors. The first microprocessor communicates with the second microprocessors.

In a class of this embodiment, the motors comprise an AC motor; the mother circuit board is provided with a drive interface for the AC motor. The AC motors are controlled by the first microprocessor via the drive interface for the AC motor.

In a class of this embodiment, the drive interface for the AC motor comprises at least one relay and a drive circuit thereof. One of the AC motors is controlled by the first microprocessor via one of the relays and the drive circuit thereof.

In a class of this embodiment, the rotor position detection unit is a phase current detection unit; and the rotor position data are calculated by real time phase current.

In a class of this embodiment, the first microprocessor is provided with an internal or external memory for storing operating parameters and operating modes of the motors.

In a class of this embodiment, the first microprocessor communicates with the second microprocessors via a bus mode; and a bus is distributed on the mother circuit board.

In a class of this embodiment, the application system controller is an air conditioning system controller, an HVAC system controller, a pump system controller, a washing machine controller, or an automotive controller.

In a class of this embodiment, the power supply comprises a commutated current and a DC/DC step-down circuit.

Advantages according to embodiments of the invention are summarized as follows:

1) The first centralized motor controller is connected to the application system controller for receiving commands from the application system controller and controlling operation of the independent motors. The first centralized motor comprises the power supply; the microprocessor; and the interface circuit for motor control. The power supply supplies power for each circuit part. The motors are controlled by the microprocessor via the interface circuit for motor control. A number of the motors is equal to or more than three, in which, at least two of the motors are permanent magnet synchronous motors in the absence of a motor controller. The interface circuit for motor control comprises at least two inverter units and two rotor position detection units. The permanent magnet synchronous motors are driven by the microprocessor via the inverter units. Rotor position data of the permanent magnet synchronous motors are transmitted to the microprocessor via the rotor position detection units. The independent arrangement of the power supply and the microprocessor on each original motor controller is deleted. The circuit structure is simplified, the overlapped circuit configuration is deleted, the production cost is largely decreased, and the resource waste is decreased. The heat dissipation capability of the centralized motor controller is relatively good, and the unstable problem caused by the poor heat dissipation of the original motor controller is solved.

2) The motors comprise the AC motor; the interface circuit for motor control comprises the relay and the drive circuit thereof; and the AC motor is controlled by the microprocessor via the relay and the drive circuit thereof, thereby being much widely applicable.

3) The motors are all permanent magnet synchronous motors in the absence of motor controllers. The interface circuit for motor control comprises the inverter units and the rotor position detection units. One motor is connected to the microprocessor via one inverter unit and one rotor position detection unit. Thus, the energy saving purpose is achieved to the utmost while the production cost is decreased.

4) The rotor position detection unit is the phase current detection unit; and the rotor position data are calculated by real time phase current, so that the connection is simplified, the Hall elements are not adopted, and the production cost is decreased.

5) The power supply, the microprocessor, the user interface, and the memory are integrated on a main circuit board. One inverter and one rotor position detection unit are integrated on one daughter circuit board. The main circuit board and the daughter circuit boards are connected via the connector ports and the connectors. Thus, the configuration can be designed according to the practical conditions, thereby being flexible and convenient.

6) The second centralized motor controller is connected to the application system controller. The second centralized motor controller comprises the mother circuit board and the daughter circuit boards. The mother circuit board is provided with the power supply and the first microprocessor. The power supply supplies power to each circuit part and each daughter circuit board. Three or more than three motors are provided, in which, at least two motors are permanent magnet synchronous motors without motor. At least two daughter circuit boards are provided. Each daughter circuit board comprises: the second microprocessor, the inverter unit, and the rotor position detection unit. Each of the daughter circuit boards is connected to one permanent magnet synchronous motor. The mother circuit board and the daughter circuit boards form electric connection via connectors. The first microprocessor communicates with the second microprocessors. Thus, the circuit structure is simplified, the overlapped circuit configuration is deleted, the production cost is largely decreased, and the resource waste is reduced. The centralized motor controller can be flexibly applied to motors of different kinds, thereby being convenient in use. Besides, the heat dissipation capability of the centralized motor controller is relatively good and the unstable problem caused by the poor heat dissipation of the original motor controller is solved.

7) The motors comprise an AC motor; the mother circuit board is provided with the drive interface for the AC motor. The AC motors are controlled by the first microprocessor via the drive interface for the AC motor, so that the application is much wider.

8) The first microprocessor communicates with the second microprocessors via the bus mode; and the bus is distributed on the mother circuit board, thereby being convenient for manufacturing.

9) Operating parameters and operating modes of the motor are stored by the memory, thereby being convenient in use.

BRIEF DESCRIPTION OF THE DRAWINGS

The invention is described hereinbelow with reference to the accompanying drawings, in which.

DETAILED DESCRIPTION OF THE EMBODIMENTS

For further illustrating the invention, experiments detailing a centralized motor controller are described below. It should be noted that the following examples are intended to describe and not to limit the invention.

Example 1

Figure 1:
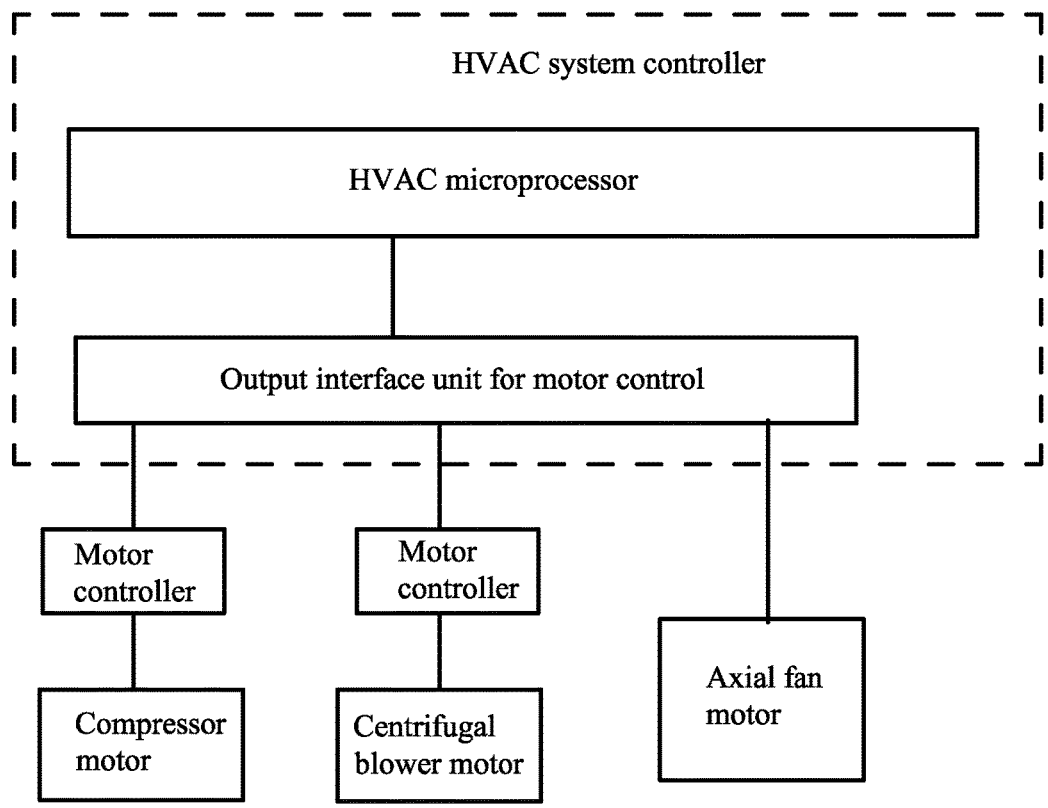
FIG. 1 is a structure block diagram of a typical air conditioning system HVAC.
Figure 2:
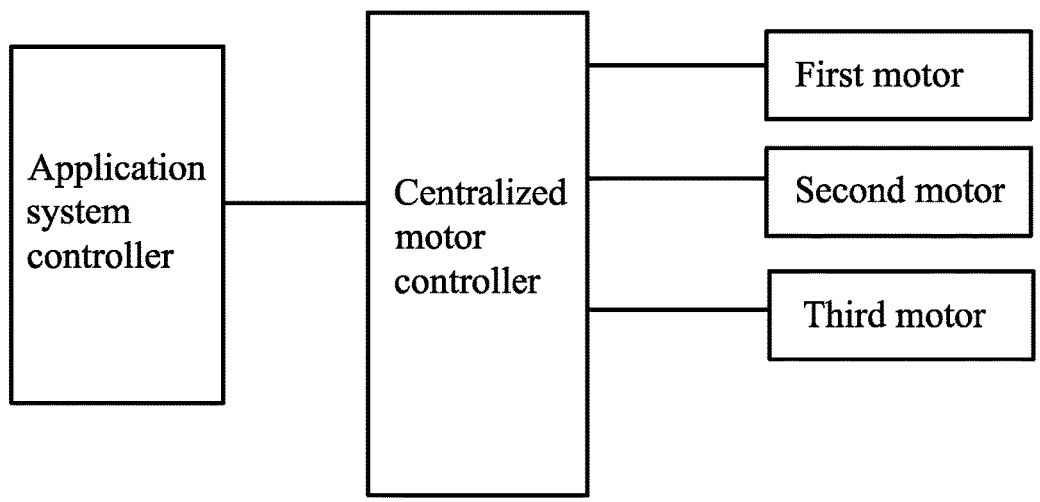
FIG. 2 is a block diagram of a centralized motor controller in accordance with one embodiment of the invention.
Figure 3:
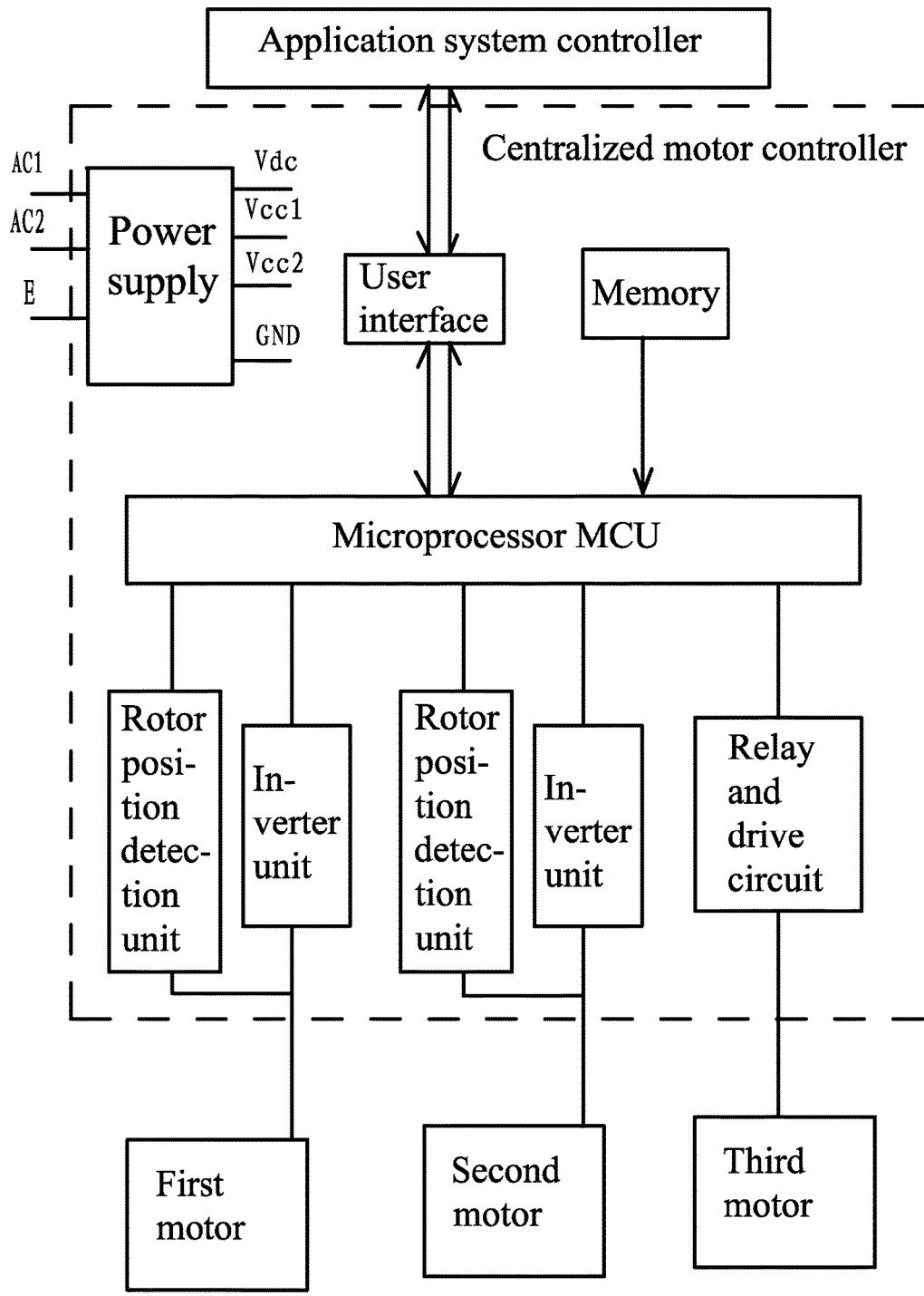
FIG. 3 is a specific block diagram of FIG. 2.
Figure 4:
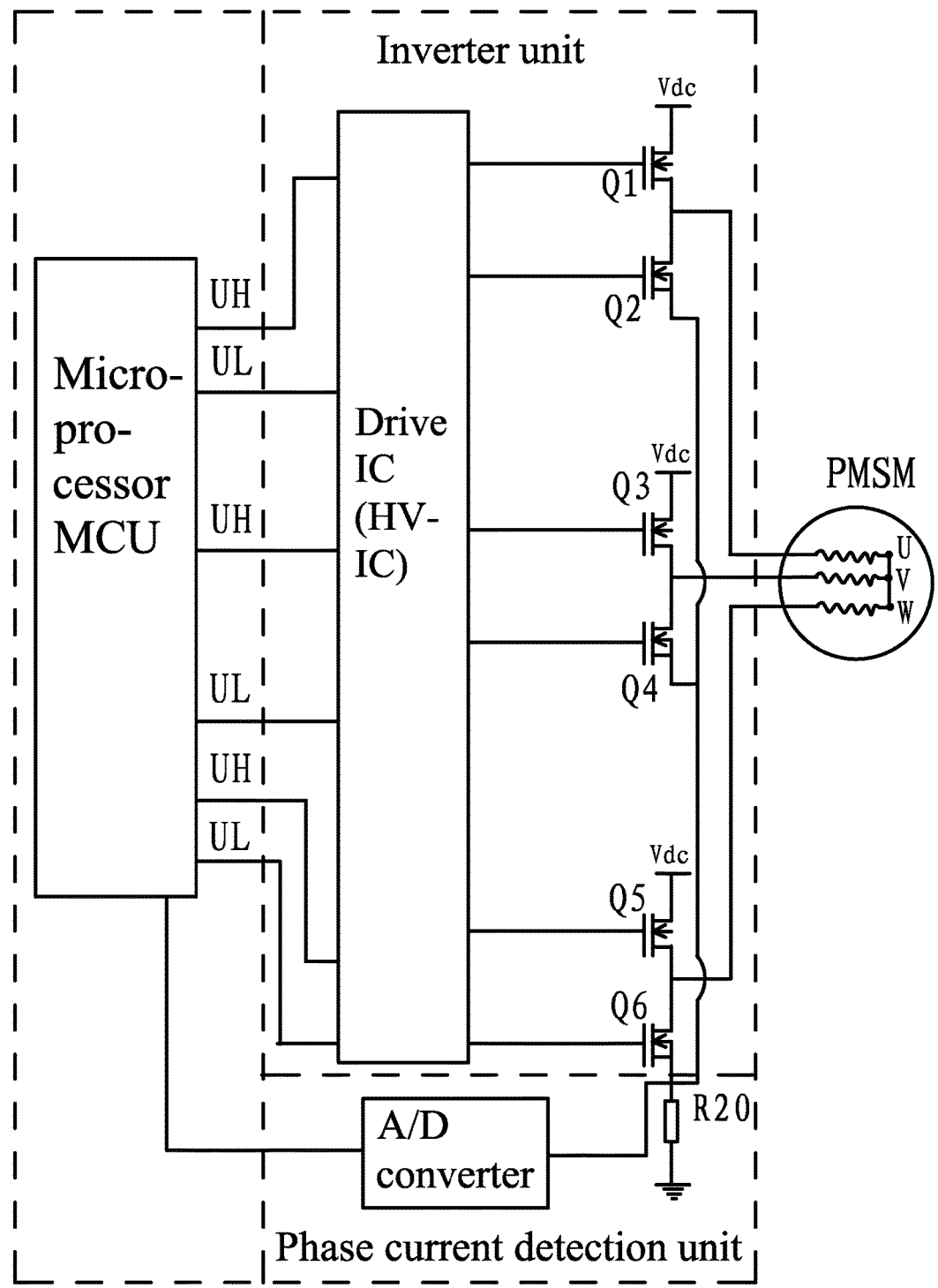
FIG. 4 is a circuit diagram of an inverter unit and a rotor position detection unit in accordance with one embodiment of the invention.

As shown in FIGS. 2-3, a centralized motor controller is connected to an application system controller for receiving commands therefrom and controlling operation of a plurality of independent motors. The centralized motor controller comprises: a power supply, a microprocessor, an interface circuit for motor control. The power supply supplies power to each circuit part, and the motors are controlled by the microprocessor via the interface circuit for motor control. The number of the motors is three, that is, a first motor, a second motor, and a third motor. The first motor and the second motor are permanent magnet synchronous motors in the absence of a motor controller, and the third motor is an AC motor. The interface circuit for motor control comprises: two inverter units, two rotor position detection units, and one relay and drive circuit thereof. The permanent magnet synchronous motors are driven by the microprocessor via the inverter units. Rotor position data of the permanent magnet synchronous motors are sent from the rotor position detection units to the microprocessor. One inverter unit and one rotor position detection unit are connected to one permanent magnet synchronous motor, respectively. The third motor is controlled by the microprocessor via the relay and the drive circuit thereof. The application system controller is an air conditioning system controller, an HVAC system controller, a pump system controller, a washing machine controller, or an automotive controller. The microprocessor is connected to the application system controller via a user interface As shown in FIG. 4, the permanent magnet synchronous motor is controlled by the microprocessor MCU. The rotor position detection unit is a phase current detection unit, and the rotor position data are calculated by real time phase current. The phase current detection unit comprises a resistance R20 and an A/D converter. The phase current detection unit adopts a vector control mode without position sensor to only detect the phase current of a motor winding and calculate the rotor position. The phase current detection unit further utilizes a plurality of IGBT switches Q1, Q2, Q3, Q4, Q5, and Q6 of inverter units to control the current of the motor winding. The circuit structure and the connection are simplified and the detection signal is few, thereby further decreasing the production cost. The microprocessor is also connected to the user interface. The microprocessor is connected to the application system controller via the user interface. The microprocessor is provided with an internal or external memory for storing operating parameters and operating modes of the motors. Only one rotor position detection unit and one inverter unit connected to the microprocessor are illustrated in FIG. 4. The power supply, the microprocessor, the user interface, and the memory are integrated on a main circuit board. One inverter unit and one rotor position detection unit are integrated on one daughter circuit board. The main circuit board is connected to two or more than two daughter circuit boards via connector ports and connectors. The above configuration can be designed according to practical conditions, thereby being flexible and convenient.

Example 2

Figure 5:
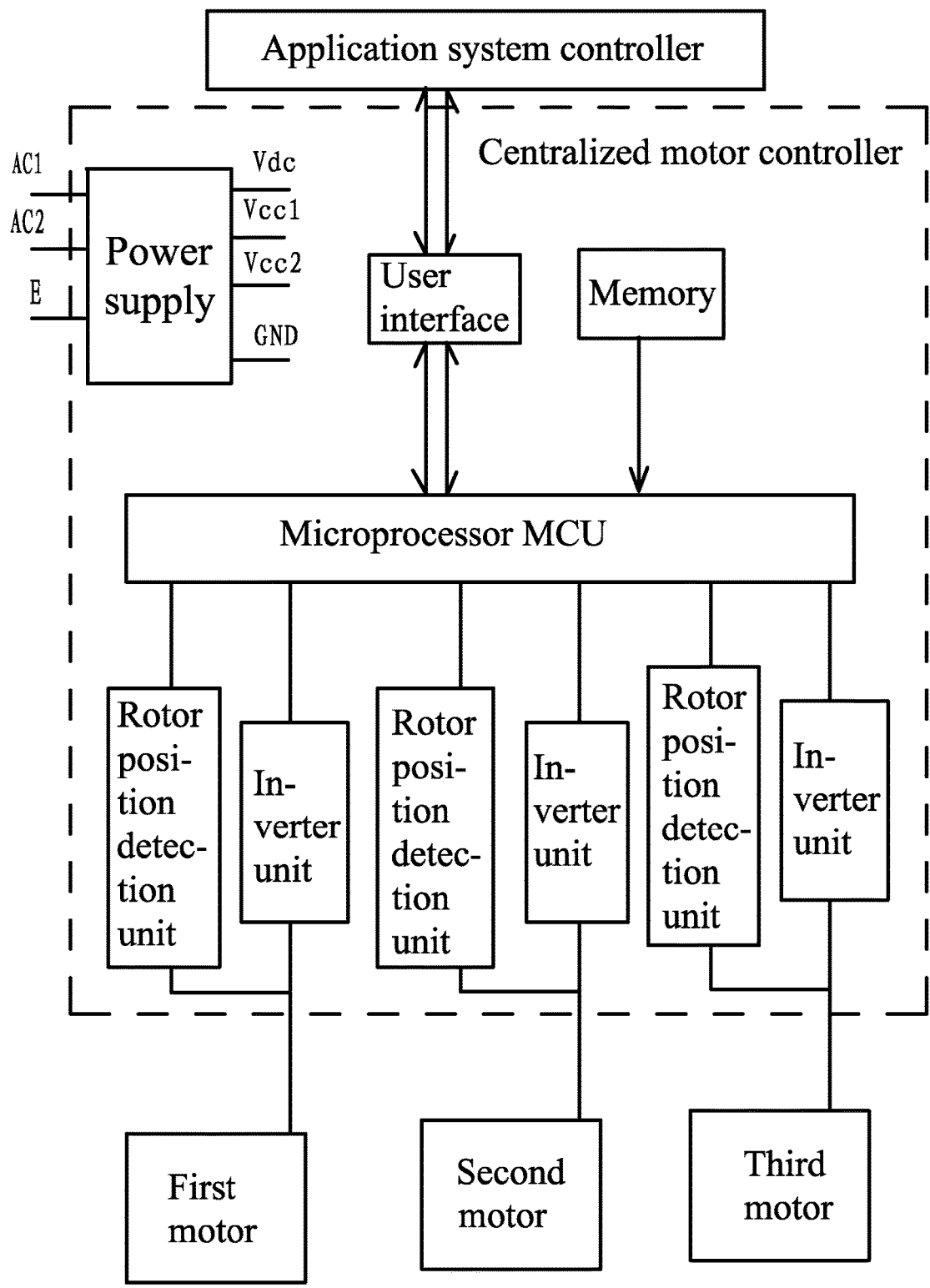
FIG. 5 is a block diagram of a centralized motor controller in accordance with Example 2.

As shown in FIG. 5, the centralized motor controller is different from that in Example 1 in the following respects: the first motor, the second motor, and the third motor are all permanent magnet synchronous motors in the absence of a motor controller; the interface circuit for motor control comprises at least three inverter units and three rotor position detection units; rotor position data of the three motors are respectively detected by the three rotor position detection units and transmitted to the microprocessor; and the three permanent magnet synchronous motors are driven by the microprocessor via the three inverter units.

Example 3

Figure 6:
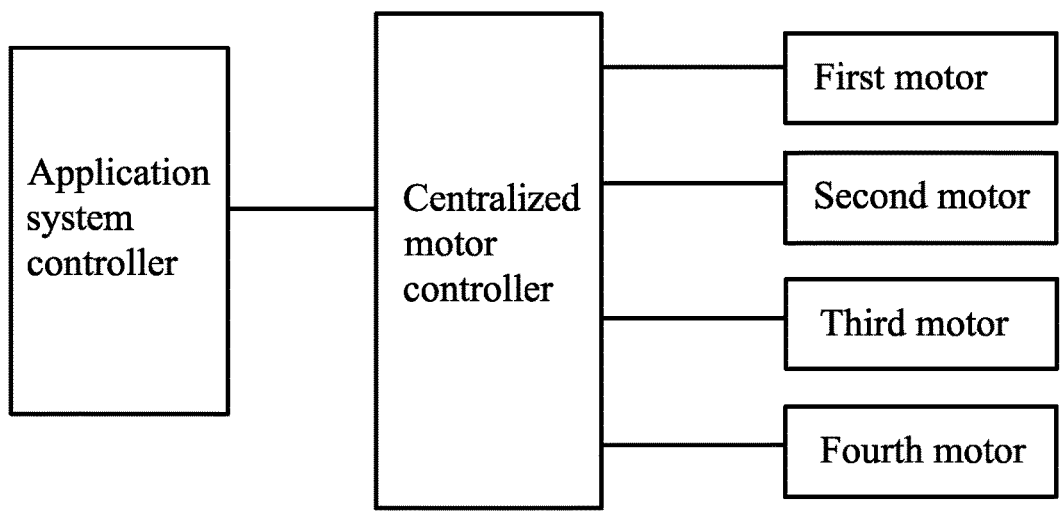
FIG. 6 is a block diagram of a centralized motor controller in accordance with Example 3.
Figure 7:
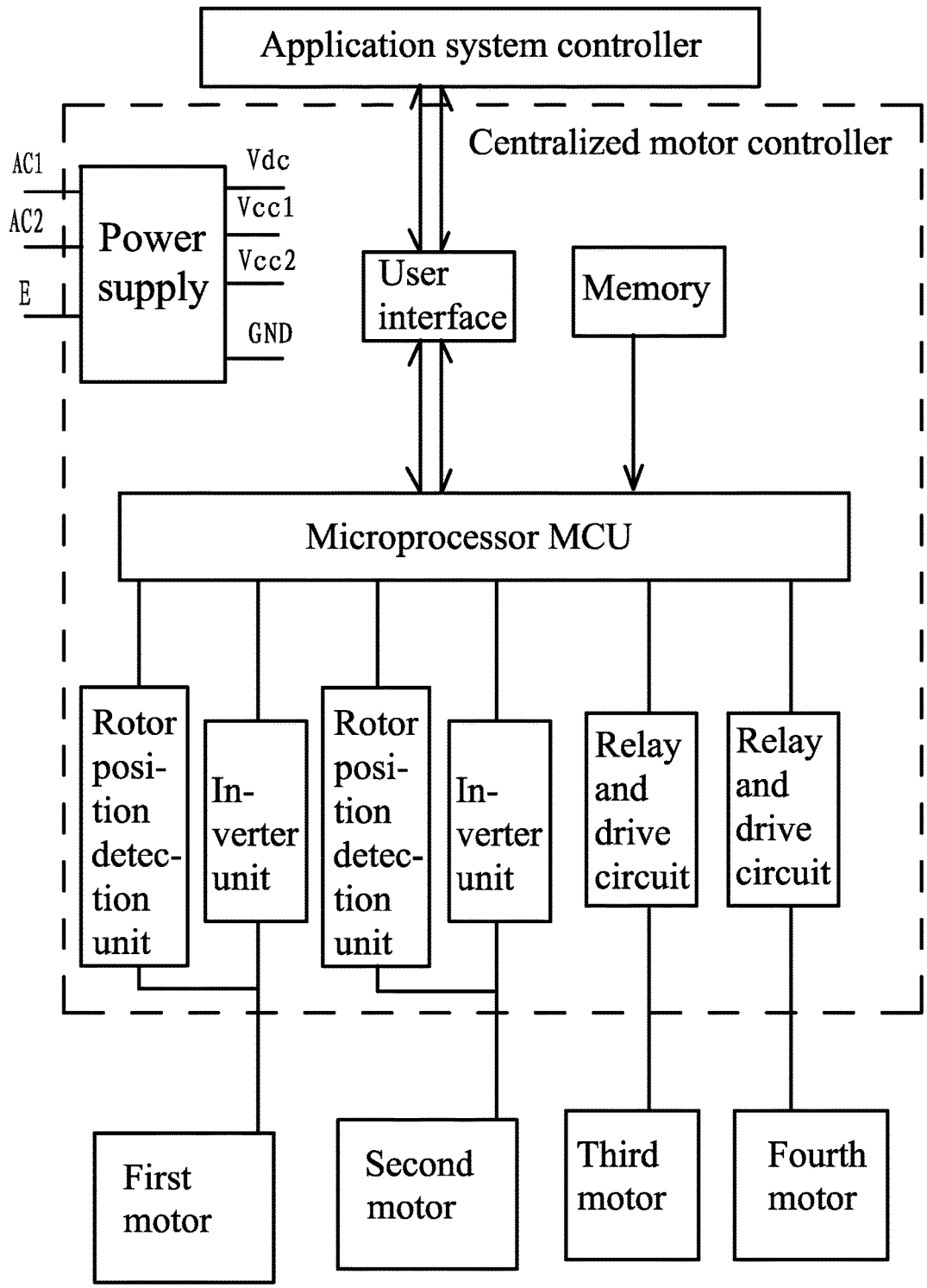
FIG. 7 is a specific block diagram of FIG. 6.

As shown in FIGS. 6-7, the centralized motor controller is different from that in Example 1 in the following respects: the microprocessor controls a first motor, a second motor, a third motor, and a fourth motor, via the interface circuit for motor control; the first motor and the second motor are permanent magnet synchronous motors in the absence of a motor controller; and the third motor and the fourth motor are AC motors; the interface circuit for motor control comprises: two inverter units, two rotor position detection units, and two relays and drive circuits thereof; the first motor and the second motor are driven by the microprocessor via the two inverter units, respectively; rotor position data of the first motor and the second motor are transmitted to the microprocessor via the two rotor position detection units, respectively; and the third motor and the fourth motor are controlled by the microprocessor by the two relays and the drive circuits thereof, respectively.

Example 4

Figure 8:
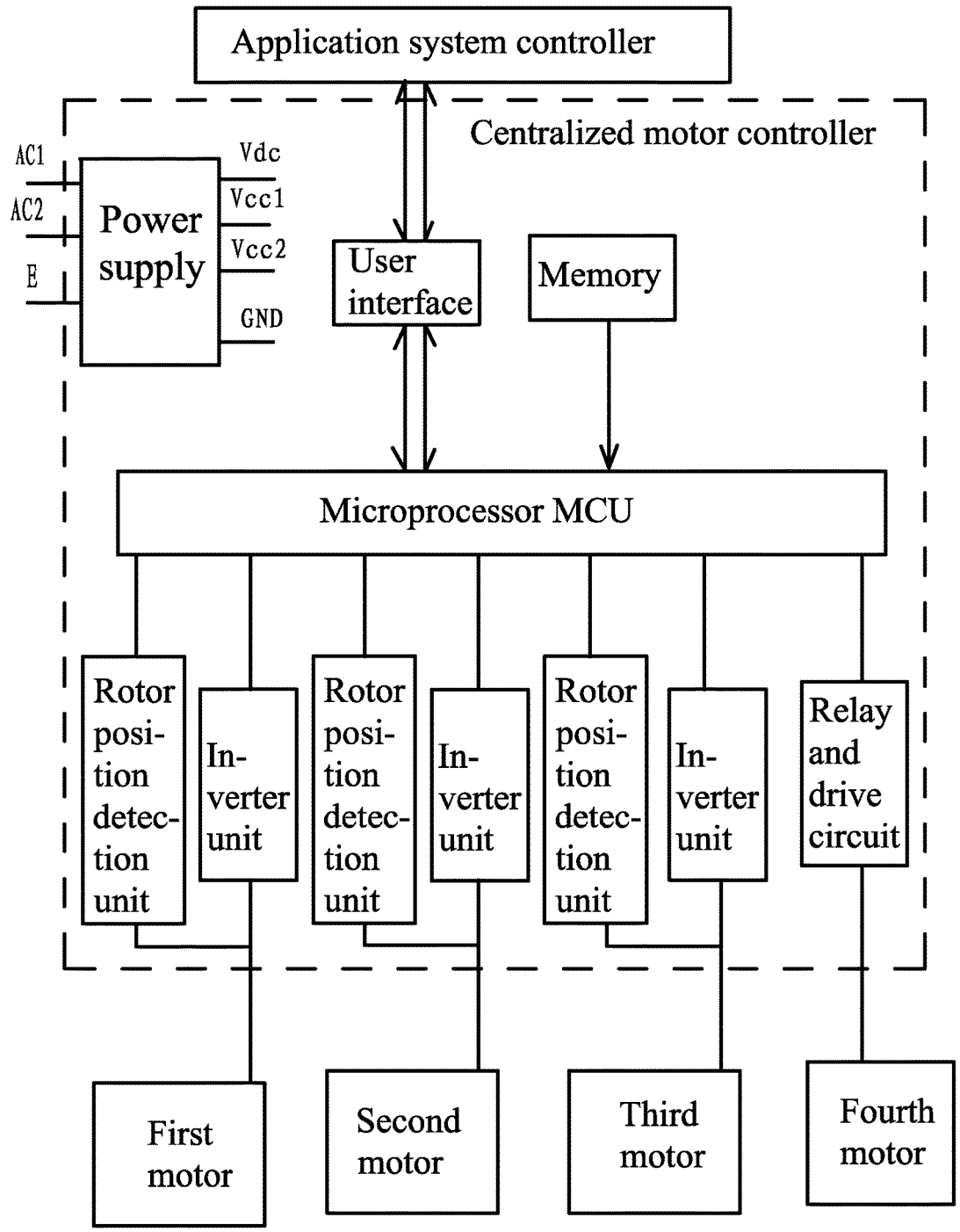
FIG. 8 is a block diagram of a centralized motor controller in accordance with Example 4.

As shown in FIG. 8, the centralized motor controller is the same as that in Example 3 except that: the microprocessor controls a first motor, a second motor, a third motor, and a fourth motor, via the interface circuit for motor control; the first motor, the second motor, and the third motor are permanent magnet synchronous motors in the absence of a motor controller, and the fourth motor is an AC motor; the interface circuit for motor control comprises: three inverter units, three rotor position detection units, and one relay and a drive circuit thereof; the first motor, the second motor, and the third motor are driven by the microprocessor via the three inverter units, respectively; rotor position data of the first motor, the second motor, and the third motor are transmitted to the microprocessor via the three rotor position detection units, respectively; and the fourth motor is controlled by the microprocessor by the relay and the drive circuit thereof, respectively.

Example 5

Figure 9:
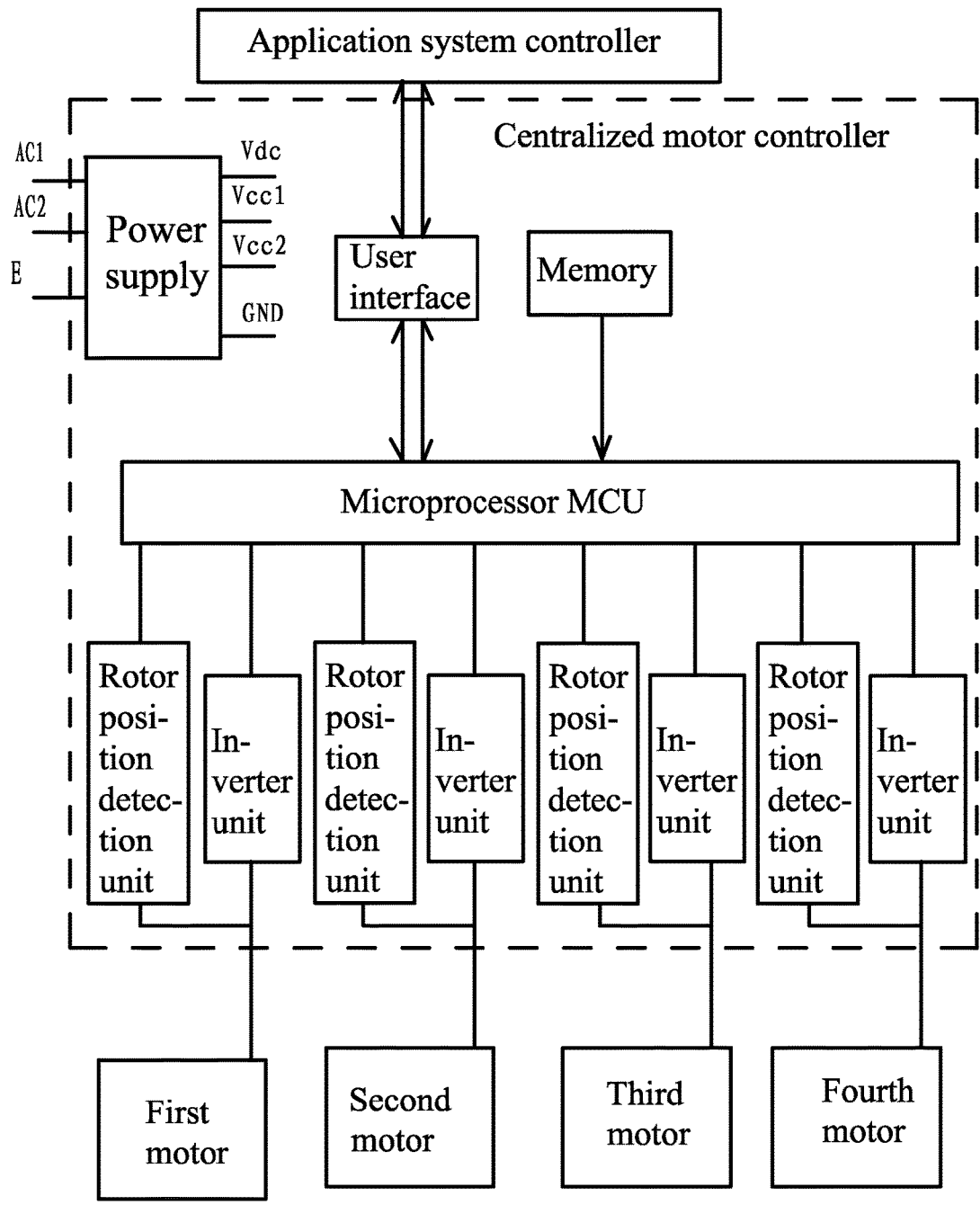
FIG. 9 is a block diagram of a centralized motor controller in accordance with Example 5

As shown in FIG. 9, the centralized motor controller is the same as that in Example 4 except that: the microprocessor controls a first motor, a second motor, a third motor, and a fourth motor via the interface circuit for motor control; the four motors are all permanent magnet synchronous motors in the absence of a motor controller; the interface circuit for motor control comprises four inverter units and four rotor position detection units; the first motor, the second motor, the third motor, and the fourth motor are driven by the microprocessor via the four inverter units, respectively; and rotor position data of the first motor, the second motor, the third motor, and the fourth motor are transmitted to the microprocessor via the four rotor position detection units, respectively.

Example 6

Figure 10:
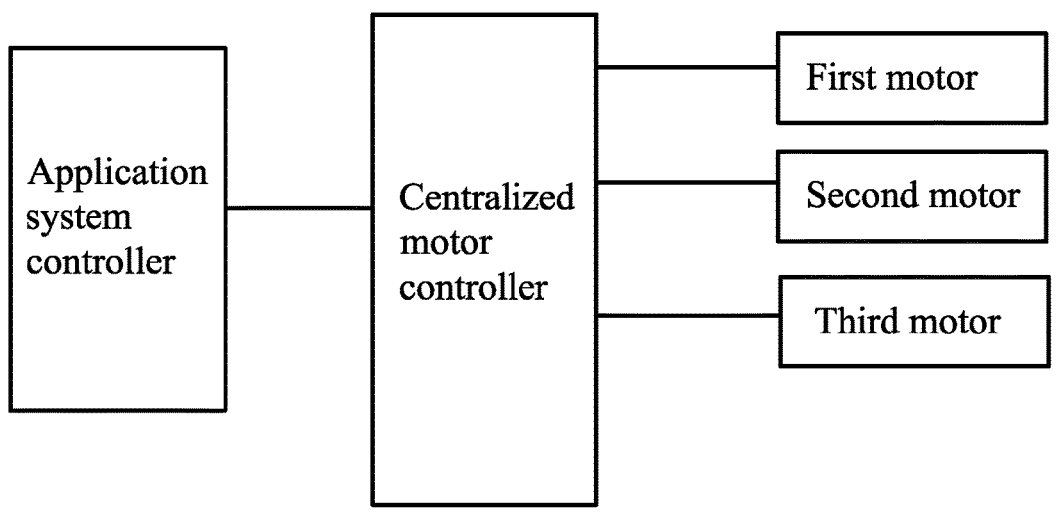
FIG. 10 is a block diagram of a centralized motor controller in accordance with Example 6.
Figure 11:
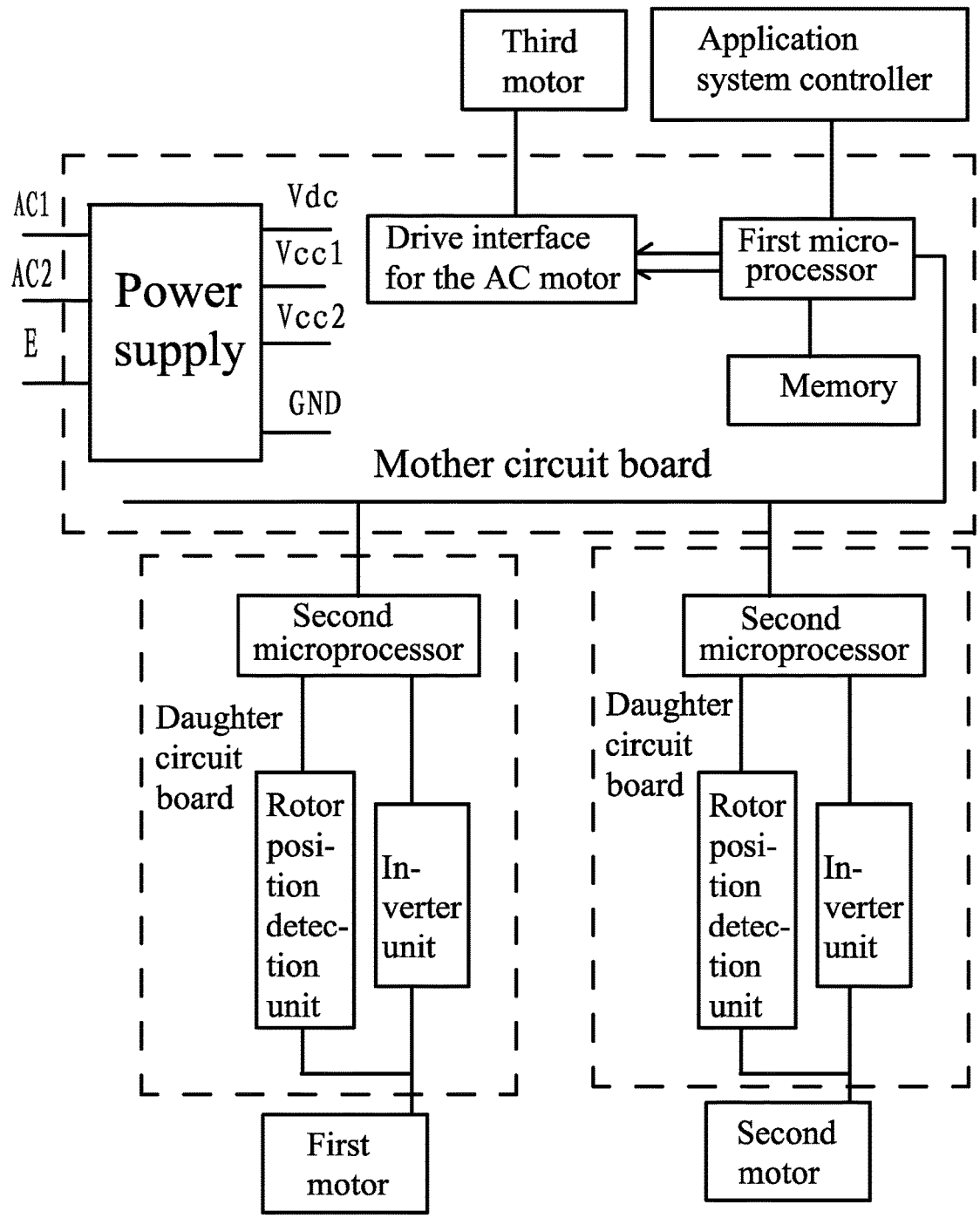
FIG. 11 is a specific block diagram of FIG. 10.

As shown in FIGS. 10-11, a centralized motor controller is connected to the application system controller for receiving commands therefrom and controlling a plurality of independent motors. The centralized motor controller comprises a mother circuit board and a plurality of daughter circuit board. The mother circuit board is provided with a power supply and a first microprocessor. The power supply supplies power to each circuit part and each daughter circuit board. The first microprocessor receives commands from the application system controller. Three motors are provided, that is, a first motor, a second motor, and a third motor. The first motor and the second motor are permanent magnet synchronous motors in the absence of a motor controller. The third motor is an AC motor. Two daughter circuit boards are provided, and each daughter circuit board comprises: a second microprocessor, an inverter unit, and a rotor position detection unit. Each daughter circuit board is connected to one permanent magnet synchronous motor. The permanent magnet synchronous motor is driven by the second microprocessor via the inverter unit. Rotor position data of the permanent magnet synchronous motor are transmitted to the second microprocessor via the rotor position detection unit. The mother circuit board and the daughter circuit boards form electric connection via connectors. The first microprocessor communicates with the second microprocessors.

The mother circuit board is provided with a drive interface for the AC motor. The third motor is controlled by the first microprocessor via the drive interface for the AC motor. The drive interface for the AC motor comprises one relay and a drive circuit thereof. The AC motor is controlled by the first microprocessor via the relay and the drive circuit thereof. The first microprocessor is provided with an internal or external memory for storing operating parameters and operating modes of the motors. The first microprocessor communicates with the second microprocessors via a bus mode; and a bus is distributed on the mother circuit board. The application system controller is an air conditioning system controller, an HVAC system controller, a pump system controller, a washing machine controller, or an automotive controller. The power supply comprises a commutated current and a DC/DC step-down circuit.

As shown in FIG. 4, the permanent magnet synchronous motor is controlled by the second microprocessor. The rotor position detection unit is a phase current detection unit, and the rotor position data are calculated by real time phase current. The phase current detection unit comprises a resistance R20 and an A/D converter. The phase current detection unit adopts a vector control mode without position sensor to only detect the phase current of a motor winding and calculate the rotor position. The phase current detection unit further utilizes a plurality of IGBT switches Q1, Q2, Q3, Q4, Q5, and Q6 and a drive IC (HVIC) of the inverter units to control the current of the motor winding. The circuit structure and the connection are simplified and the detection signal is few, thereby further decreasing the production cost.

The first microprocessor receives the commands from the application system controller and communicates with the second microprocessors via the bus mode. Operation of the permanent magnet synchronous motors is controlled by the second microprocessor according to the commands from the first microprocessor.

Example 7

Figure 12:
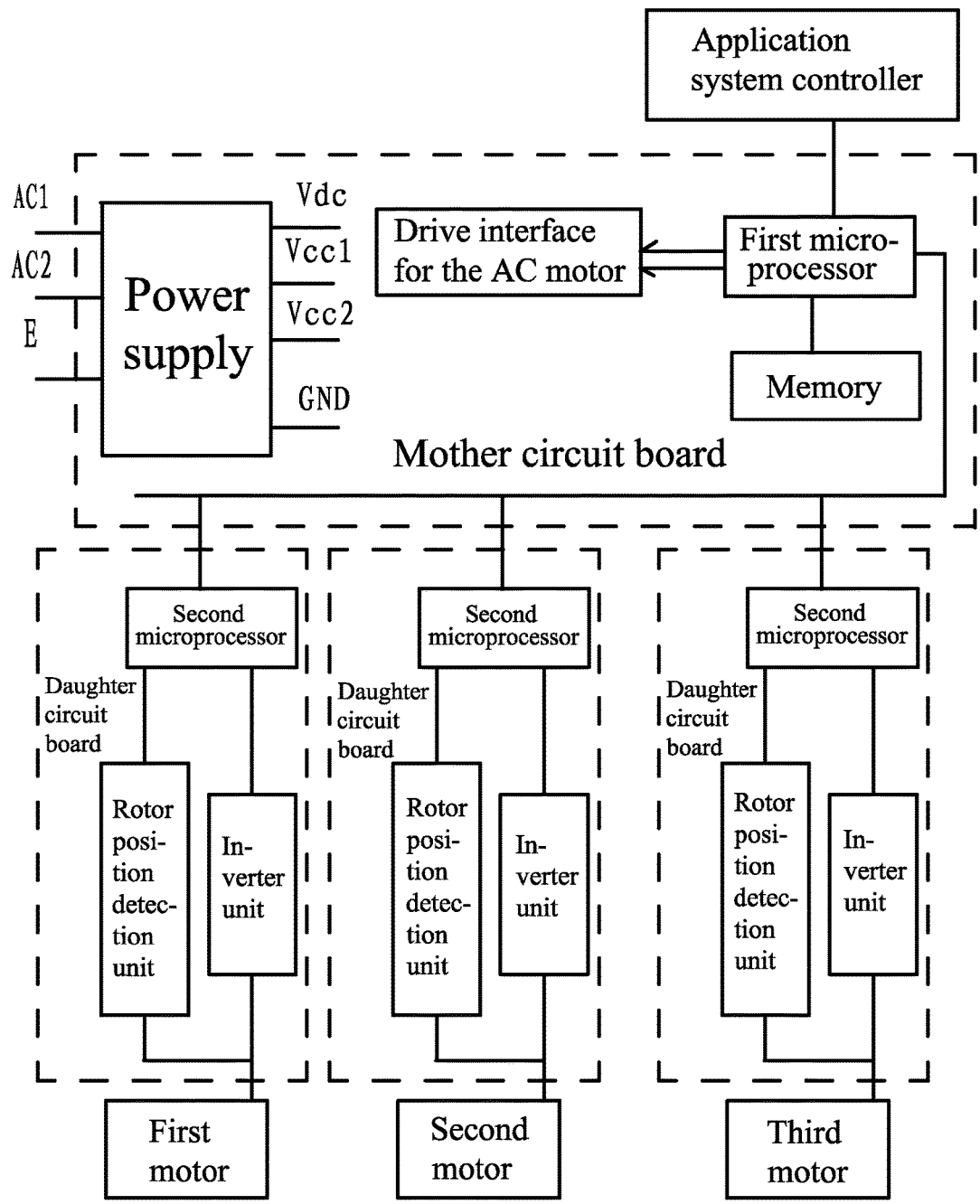
FIG. 12 is a block diagram of a centralized motor controller in accordance with Example 7.

As shown in FIG. 12, the centralized motor controller is the same as that in Example 6 except that: the first motor, the second motor, and the third motor are all permanent magnet synchronous motors in the absence of a motor controller; the first microprocessor of the mother circuit board is connected to three daughter circuit boards; and each daughter circuit board is connected to one permanent magnet synchronous motor, respectively.

Example 8

Figure 13:
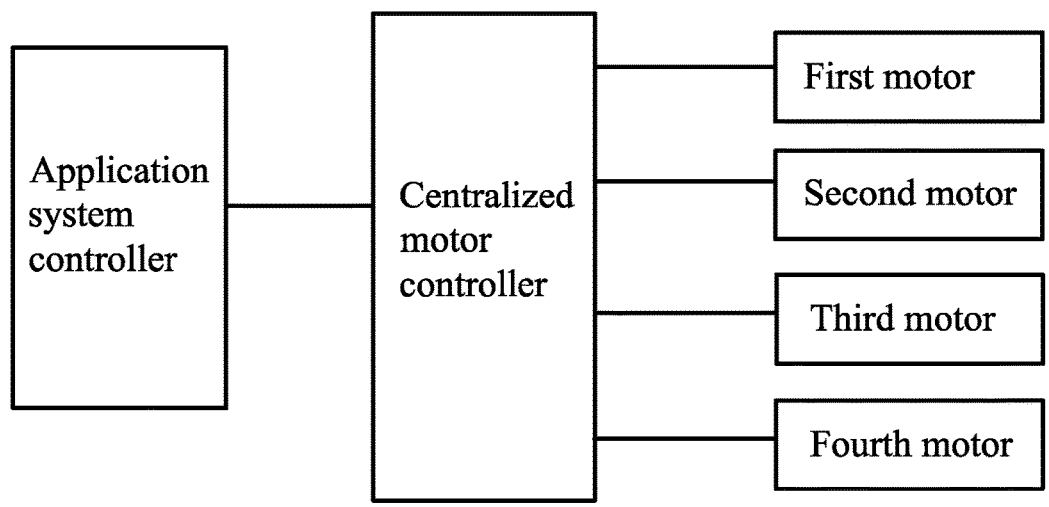
FIG. 13 is a block diagram of a centralized motor controller in accordance with Example 8.
Figure 14:
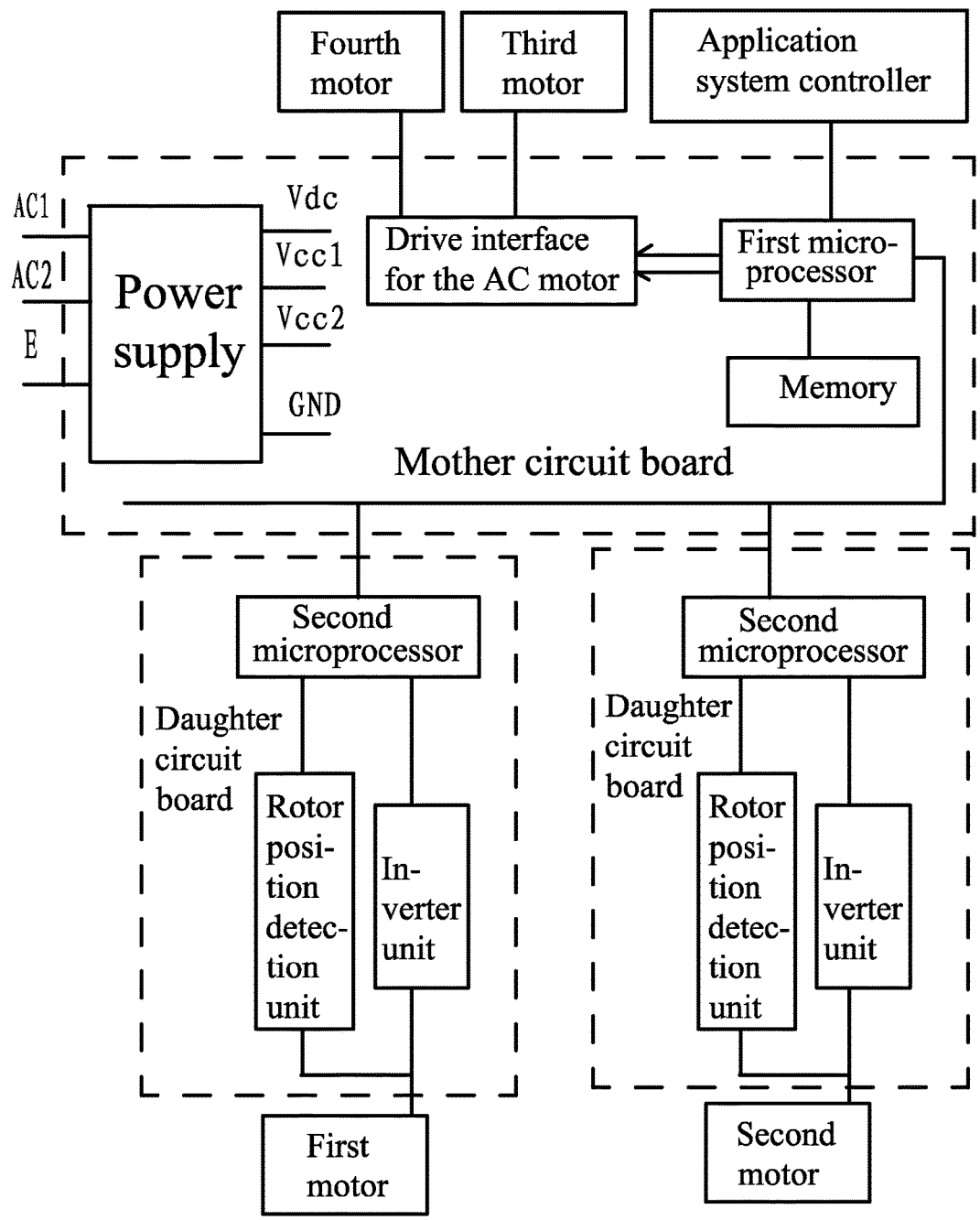
FIG. 14 is a specific block diagram of FIG. 13.

As shown in FIGS. 13-14, a centralized motor controller is different from that of Example 6 in following respects. The centralized motor controller controls a first motor, a second motor, a third motor, and a fourth motor. The first motor and the second motor are permanent magnet synchronous motors, and the third motor and the fourth motor are AC motors. Two daughter circuit boards are provided, each daughter circuit board comprises: a second microprocessor, an inverter unit, and a rotor position detection unit. Each daughter circuit board is connected to one permanent magnet synchronous motor. The permanent magnet synchronous motor is driven by the second microprocessor via the inverter unit. Rotor position data of the permanent magnet synchronous motor are transmitted to the second microprocessor by the rotor position detection unit. The mother circuit board and the daughter circuit boards form electric connection via connectors, and the first microprocessor communicates with the second microprocessors. The first motor and the second motor are connected to and controlled by two daughter circuit boards, respectively. The mother circuit board is provided with a drive interface for the AC motor, and the third motor and the fourth motor are controlled by the first microprocessor via the drive interface for the AC motor. The drive interface for the AC motor comprises two relays and drive circuits thereof. The third motor and the fourth motor are controlled by the first microprocessor via the two relays and drive circuits thereof.

Example 9

Figure 15:
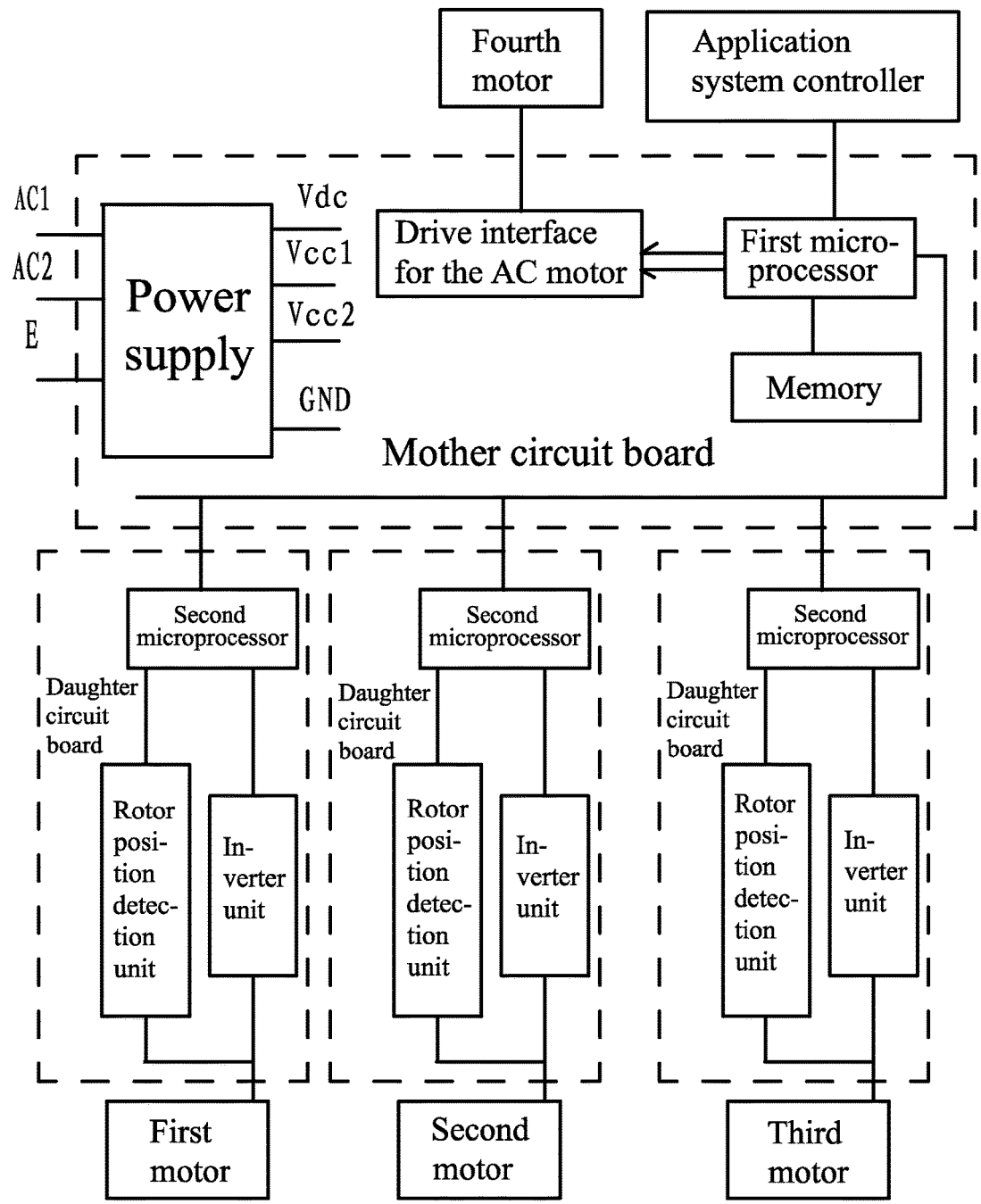
FIG. 15 is a block diagram of a centralized motor controller in accordance with Example 9.

As shown in FIG. 15, a centralized motor controller is different from that of Example 8 in following respects. The centralized motor controls a first motor, a second motor, a third motor, and a fourth motor. The first motor, the second motor, and the third motor are permanent magnet synchronous motors, and the fourth motor is an AC motor. Three daughter circuit boards are provided, and each daughter circuit board comprises: a second microprocessor, an inverter unit, and a rotor position detection unit. Each daughter circuit board is connected to one permanent magnet synchronous motor. The permanent magnet synchronous motor is driven by the second microprocessor via the inverter unit. Rotor position data of the permanent magnet synchronous motor are transmitted to the second microprocessor by the rotor position detection unit. The mother circuit board and the daughter circuit boards form electric connection via connectors, and the first microprocessor communicates with the second microprocessors. The first motor, the second motor, and the third motor are connected to and controlled by the three daughter circuit boards, respectively. The mother circuit board is provided with a drive interface for the AC motor, and the fourth motor is controlled by the first microprocessor via the drive interface for the AC motor. The drive interface for the AC motor comprises one relay and a drive circuit thereof. The fourth motor is controlled by the first microprocessor via the relay and the drive circuit thereof.

Example 10

Figure 16:
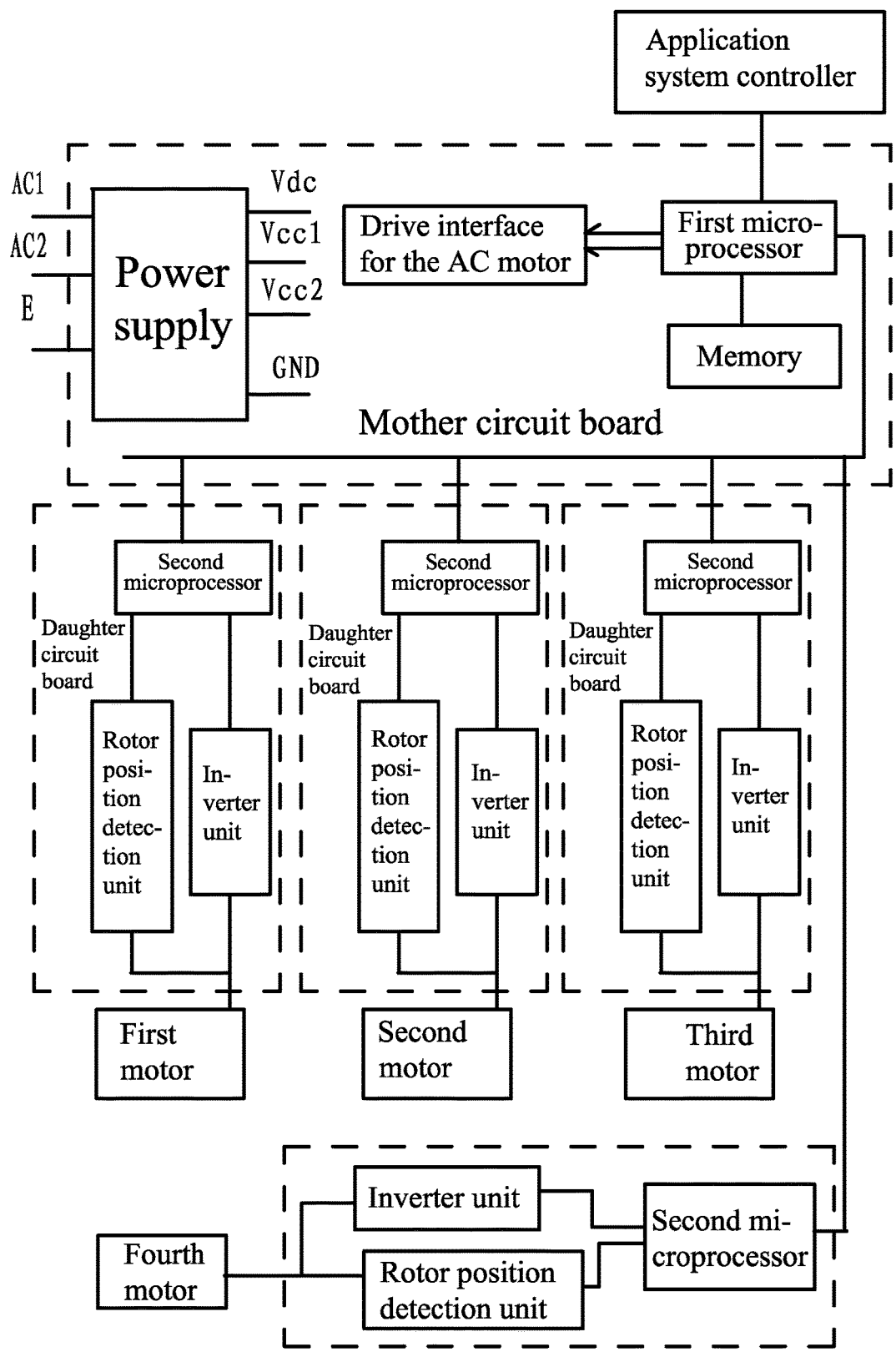
FIG. 16 is a block diagram of a centralized motor controller in accordance with Example 10.

As shown in FIG. 16, a centralized motor controller is different from that of Example 9 in following respects. The centralized motor controller controls a first motor, a second motor, a third motor, and a fourth motor. The first motor, the second motor, the third motor, and the fourth motor are all permanent magnet synchronous motors. Four daughter circuit boards are provided, each daughter circuit board comprises: a second microprocessor, an inverter unit, and a rotor position detection unit. Each daughter circuit board is connected to one permanent magnet synchronous motor. The permanent magnet synchronous motor is driven by the second microprocessor via the inverter unit. Rotor position data of the permanent magnet synchronous motor are transmitted to the second microprocessor by the rotor position detection unit. The mother circuit board and the daughter circuit boards form electric connection via connectors, and the first microprocessor communicates with the second microprocessors. The first motor, the second motor, the third motor, and the fourth motor are connected to and controlled by the four daughter circuit boards, respectively.

Figure 17:
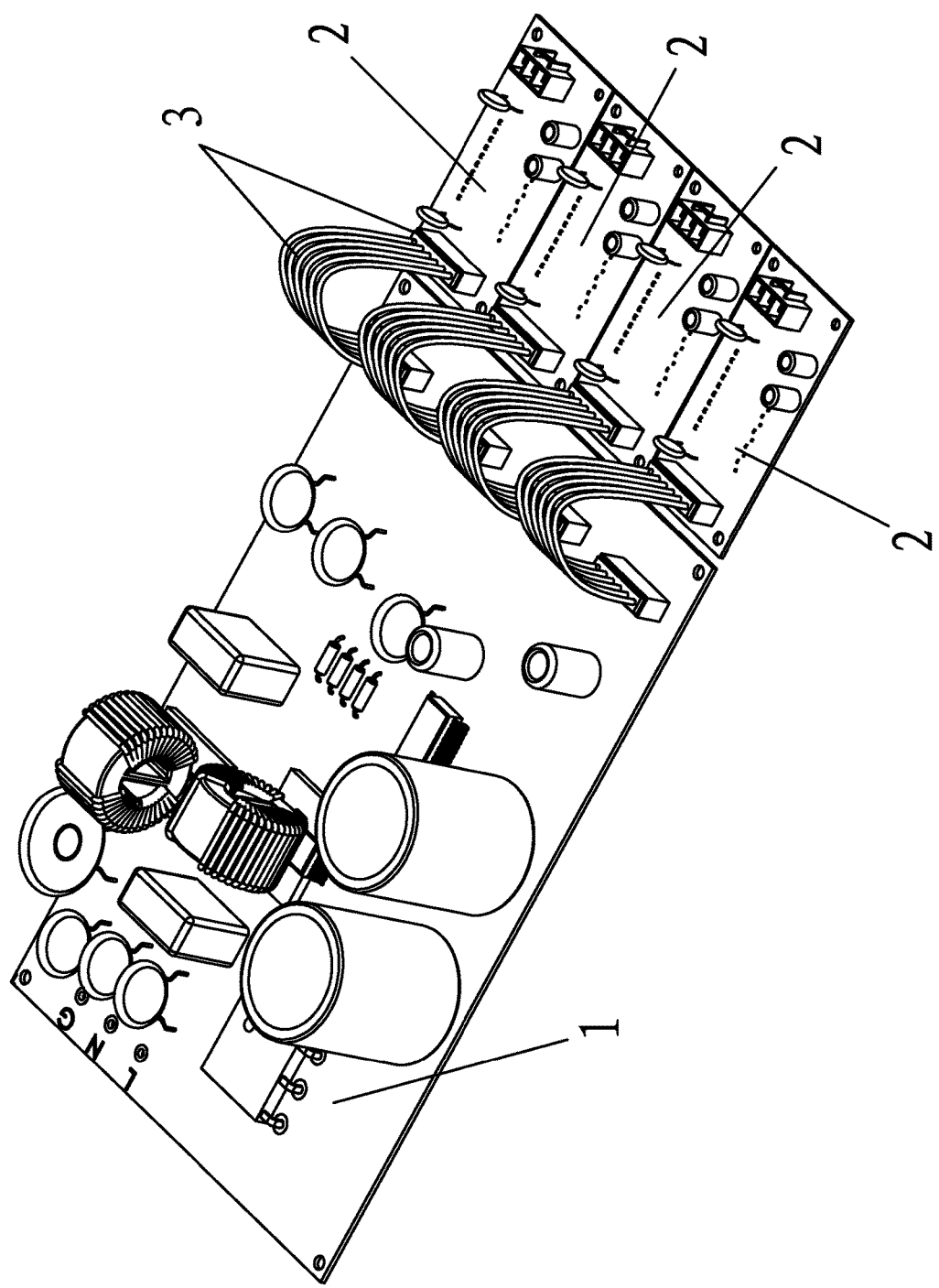
FIG. 17 is a connection diagram of a mother circuit board and daughter circuit boards of FIG. 16.

As shown in FIG. 17, the mother circuit board 1 and the four daughter circuit boards 2 form electric connection via connectors 3. The first microprocessor communicates with the second microprocessors.

Example 11

Figure 18:
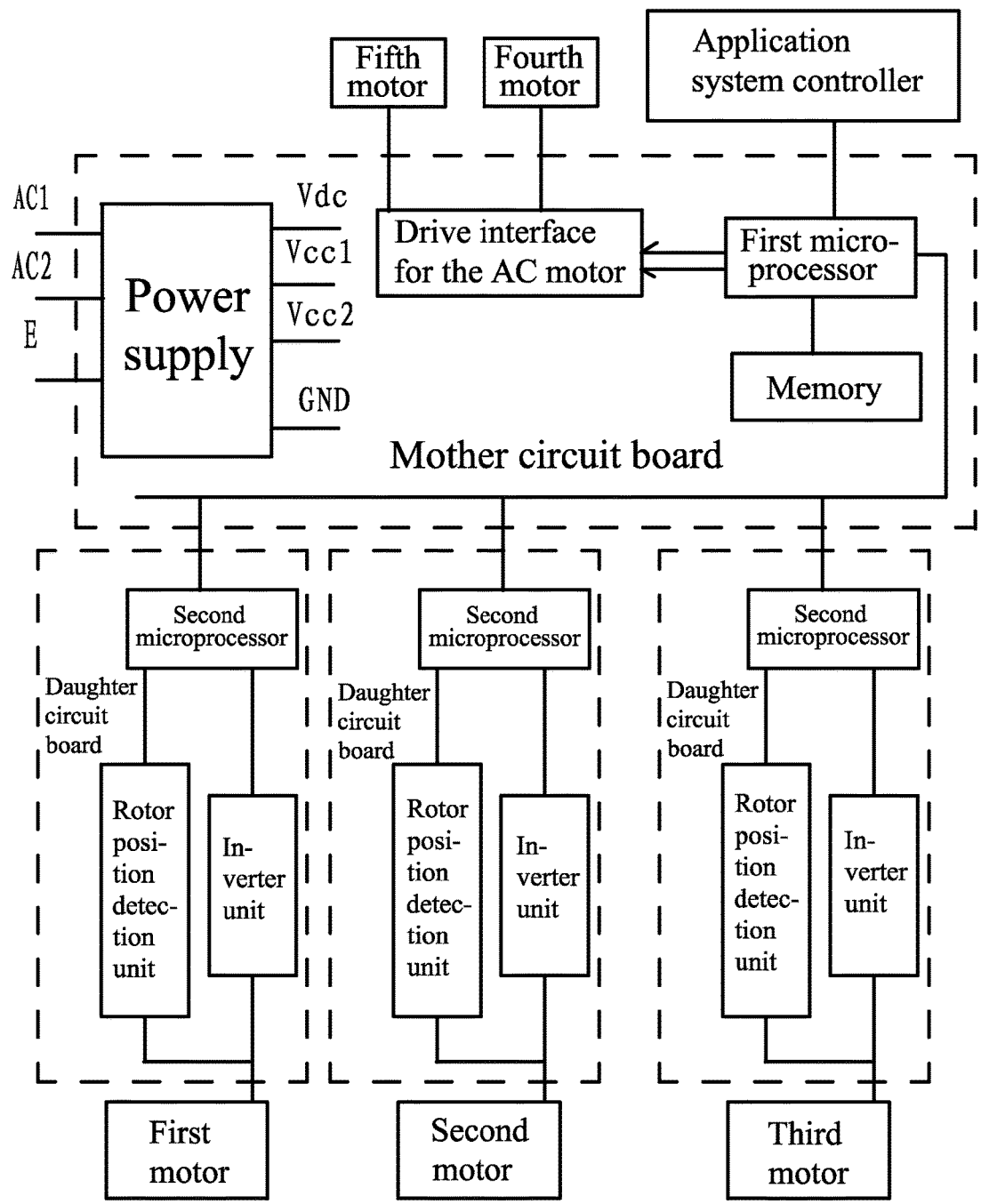
FIG. 18 is a block diagram of a centralized motor controller in accordance with Example 11.

As shown in FIG. 18, a centralized motor controller is different from that of Example 9 in following respects. The centralized motor controller controls a first motor, a second motor, a third motor, a fourth motor, and a fifth motor; in which, the first motor, the second motor, and the third motor are permanent magnet synchronous motors, and the fourth motor and the fifth are AC motors. Three daughter circuit boards are provided, and each daughter circuit board comprises: a second microprocessor, an inverter unit, and a rotor position detection unit. Each daughter circuit board is connected to one permanent magnet synchronous motor. The permanent magnet synchronous motor is driven by the second microprocessor via the inverter unit. Rotor position data of the permanent magnet synchronous motor are transmitted to the second microprocessor by the rotor position detection unit. The mother circuit board and the daughter circuit boards form electric connection via connectors, and the first microprocessor communicates with the second microprocessors. The first motor, the second motor, and the third motor are connected to and controlled by three daughter circuit boards, respectively. The mother circuit board is provided with a drive interface for the AC motor, and the fourth motor and the fifth motor are controlled by the first microprocessor via the drive interface for the AC motor. The drive interface for the AC motor comprises two relay and drive circuits thereof. The fourth motor and the fifth motor are controlled by the first microprocessor via the relays and the drive circuits thereof, respectively.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A centralized motor controller for receiving commands from an application system controller and for controlling operations of a plurality of motors, the centralized motor controller comprising:
   a) a mother circuit board, the mother circuit board comprising a power supply and a first microprocessor; and
   b) a plurality of daughter circuit boards, each daughter circuit board comprising a second microprocessor, an inverter unit, and a rotor position detection unit;

wherein:
   the mother circuit board is simultaneously connected to the plurality of daughter circuit boards;
   the power supply simultaneously supplies power to the first microprocessor, the plurality of motors, and the plurality of daughter circuit boards;
   the first microprocessor receives commands from the application system controller;
   a number of the plurality of motors is equal to or more than three, in which, at least two of the plurality of motors are permanent magnet synchronous motors in the absence of a motor controller;
   at least two daughter circuit boards are provided;
   each daughter circuit board is directly connected to one permanent magnet synchronous motor;
   the inverter unit of a daughter circuit board controls a current of the permanent magnet synchronous motor that is connected to the daughter circuit board;

the rotor position detection unit of a daughter circuit board detects rotor position data of the permanent magnet synchronous motor that is connected to the daughter circuit board;

a permanent magnet synchronous motor is driven by the second microprocessor of the daughter circuit board that is connected to the permanent magnet synchronous motor via the inverter unit of the daughter circuit board that is connected to the permanent magnet synchronous motor;

the rotor position data of the permanent magnet synchronous motor is transmitted to the second microprocessor of the daughter circuit board that is connected to the permanent magnet synchronous motor via the rotor position detection unit of the daughter circuit board that is connected to the permanent magnet synchronous motor;

the mother circuit board and the daughter circuit boards form electric connection via connectors; and the first microprocessor communicates with the second microprocessors and simultaneously controls the plurality of motors.

2. The centralized motor controller of claim 1, wherein the plurality of motors comprises an AC motor; the mother circuit board is provided with a drive interface for the AC motor; and the AC motor is controlled by the first microprocessor via the drive interface.

3. The centralized motor controller of claim 2, wherein the drive interface for the AC motor comprises at least one relay and a drive circuit thereof; and the AC motor is controlled by the first microprocessor via the one relay and the drive circuit thereof.

4. The centralized motor controller of claim 1, wherein the rotor position detection unit is a phase current detection unit; and the rotor position data are calculated by real time phase current.

5. The centralized motor controller of claim 3, wherein the rotor position detection unit is a phase current detection unit; and the rotor position data are calculated by real time phase current.

6. The centralized motor controller of claim 1, wherein the first microprocessor is provided with an internal or external memory for storing operating parameters and operating modes of the plurality of motors.

7. The centralized motor controller of claim 3, wherein the first microprocessor is provided with an internal or external memory for storing operating parameters and operating modes of the plurality of motors.

8. The centralized motor controller of claim 1, wherein the first microprocessor communicates with the second microprocessors via a bus mode; and a bus is distributed on the mother circuit board.

9. The centralized motor controller of claim 3, wherein the first microprocessor communicates with the second microprocessors via a bus mode; and a bus is distributed on the mother circuit board.

10. The centralized motor controller of claim 1, wherein the application system controller is an air conditioning system controller, an HVAC system controller, a pump system controller, a washing machine controller, or an automotive controller.

11. The centralized motor controller of claim 3, wherein the application system controller is an air conditioning system controller, an HVAC system controller, a pump system controller, a washing machine controller, or an automotive controller.

12. The centralized motor controller of claim 8, wherein the power supply comprises a commutated current and a DC/DC step-down circuit.

13. The centralized motor controller of claim 9, wherein the power supply comprises a commutated current and a DC/DC step-down circuit.

* * * * *